(12) United States Patent
Benson et al.

(10) Patent No.: US 10,541,857 B1
(45) Date of Patent: *Jan. 21, 2020

(54) PUBLIC DNS RESOLVER PRIORITIZATION

(71) Applicant: Amazon Technologies, Inc., Seattle, WA (US)

(72) Inventors: Bryan Mark Benson, Seattle, WA (US); David Dongyi Lu, Seattle, WA (US); Michael F. Diggins, Seattle, WA (US); Xingbo Wang, Kirkland, WA (US); Colm MacCarthaigh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/976,851

(22) Filed: May 10, 2018

Related U.S. Application Data

(63) Continuation of application No. 14/623,408, filed on Feb. 16, 2015, now Pat. No. 9,979,588.

(51) Int. Cl.
*H04L 29/12* (2006.01)
*H04L 29/06* (2006.01)

(52) U.S. Cl.
CPC ...... *H04L 29/12066* (2013.01); *H04L 61/106* (2013.01); *H04L 61/1511* (2013.01); *H04L 63/1425* (2013.01); *H04L 61/6068* (2013.01)

(58) Field of Classification Search
CPC ......... H04L 29/12066; H04L 29/12047; H04L 61/1511; H04L 63/1425
USPC ........................................................ 709/201
See application file for complete search history.

(56) References Cited

U.S. PATENT DOCUMENTS

| 9,979,588 B1* | 5/2018 | Benson | ............... H04L 61/1511 |
| 2003/0070096 A1* | 4/2003 | Pazi | ................. H04L 29/12066 726/4 |

\* cited by examiner

*Primary Examiner* — Sm A Rahman
*Assistant Examiner* — Chen-Liang Huang
(74) *Attorney, Agent, or Firm* — Thorpe North & Western, LLP.

(57) ABSTRACT

A technology is described for prioritizing DNS name resolutions requests received from DNS resolvers. An example method may include identifying a resolver as a public DNS resolver. Receiving a DNS name resolution request from the public DNS resolver. Assigning a priority to the DNS name resolution request received from the public DNS resolver that is lower priority as compared to a priority assigned to DNS name resolution requests received from known DNS resolvers, and providing the DNS name resolution request to the DNS name server according to the priority assigned to the DNS name resolution request.

20 Claims, 8 Drawing Sheets

PUBLIC DNS RESOLVER PRIORITIZATION

PRIORITY DATA

This application is a continuation of U.S. patent application Ser. No. 14/623,408, filed Feb. 16, 2015, which is incorporated herein by reference.

BACKGROUND

DNS (Domain Name System) resolvers are devices and software services (e.g., client side or at an internet service provider (ISP)) that communicate with DNS name servers within the DNS system to resolve a domain name in response to a DNS name resolution request. Resolving a domain name may be the process of identifying a network address that is mapped to a domain name. For example, the domain name example.com may be mapped to the IPv4 address 93.184.216.119. DNS resolvers may be found in enterprise networks and ISP (Internet Service Provider) networks, as well as public DNS resolvers (e.g., Open DNS Resolvers) which may be DNS resolvers that are operated and maintained by various private entities. The DNS resolvers use the DNS system protocol to retrieve DNS information from authoritative servers and return the DNS information to various end-user applications.

DNS name servers are often targets for malicious attacks where DNS resolution requests sent by unknown DNS resolvers are meant to overwhelm a DNS name server. These malicious attacks can potentially cause a targeted DNS name server to slow to a point that the DNS name server may be unable to respond to legitimate DNS resolution requests. For example, a DDoS (Distributed Denial of Service) attack may be a type of malicious attack where an attacker sends IP (Internet Protocol) packets from a false (or "spoofed") source address in order to disguise the identity of the attacker. A Denial-of-service attack may use IP spoofing to overload networks and devices with IP packets that appear to be from legitimate source addresses. The overload of IP packets may cause the DNS name server to become slow in responding, resulting in the DNS name server being unable to respond to legitimate DNS resolution requests. In the event of a malicious attack, network administrators may have a difficult time identifying non-malicious DNS resolution requests from malicious DNS resolution requests.

DETAILED DESCRIPTION

A technology is described for prioritizing DNS network traffic sent to a DNS name server by identifying known DNS resolvers and assigning the known DNS resolvers a higher priority as compared to other unknown DNS resolvers when fulfilling DNS name resolution requests. In one example configuration, historical data related to DNS name resolution requests made by DNS resolvers to a DNS name server may be used to identify known DNS resolvers. A known DNS resolver may be a DNS resolver that has characteristics that correspond with a valid DNS resolver (e.g., has a static IP address, caches DNS records, makes DNS resolution requests for valid domain names, etc.). The historical data for a DNS resolver may be identified using a network address (e.g., an IP address) associated with the DNS resolver and the historical data may be analyzed to identify DNS resolver characteristics that correspond to a valid DNS resolver.

DNS resolvers that have one or more characteristics of a valid DNS resolver may be classified as known DNS resolvers. DNS resolvers classified as known DNS resolvers may be provided a greater level of trust based on a history of interaction with a DNS name server that shows that the known DNS resolver may be a valid DNS resolver. DNS name resolution requests made to a DNS name server by DNS resolvers may be prioritized according to whether a DNS resolver may be identified as a known DNS resolver or an unknown DNS resolver. For example, network addresses for known DNS resolvers may be added to a set of known DNS resolvers. DNS name resolution requests received from DNS resolvers that are included in the set of known DNS resolvers may be assigned a higher priority as compared to a priority assigned to DNS name resolution requests associated with unknown DNS resolvers. Any method of assigning a priority or rank to a DNS name resolution request may be used. The DNS name resolution request may then be provided to the DNS name server according to the priority of the DNS name resolution request.

Malicious attacks like a DDoS attack may result in a flood of DNS name resolution requests that are sent to a DNS name server. Because the DNS name resolution requests may originate from senders that impersonate network addresses for legitimate DNS resolvers, a practice termed "spoofing", it may be difficult to separate non-malicious requests from malicious requests. As a result of the technology disclosed herein, DNS name resolution requests may be prioritized based on whether the DNS name resolution requests are associated with a network address for a known DNS resolver or an unknown DNS. As a result, DNS name resolution requests associated with known DNS resolvers may assigned a higher priority and be provided to a DNS name server and DNS name resolution requests associated with unknown DNS resolvers may be assigned a lower priority and dropped in the event that available computing capacity may be fully utilized.

Figure 1:
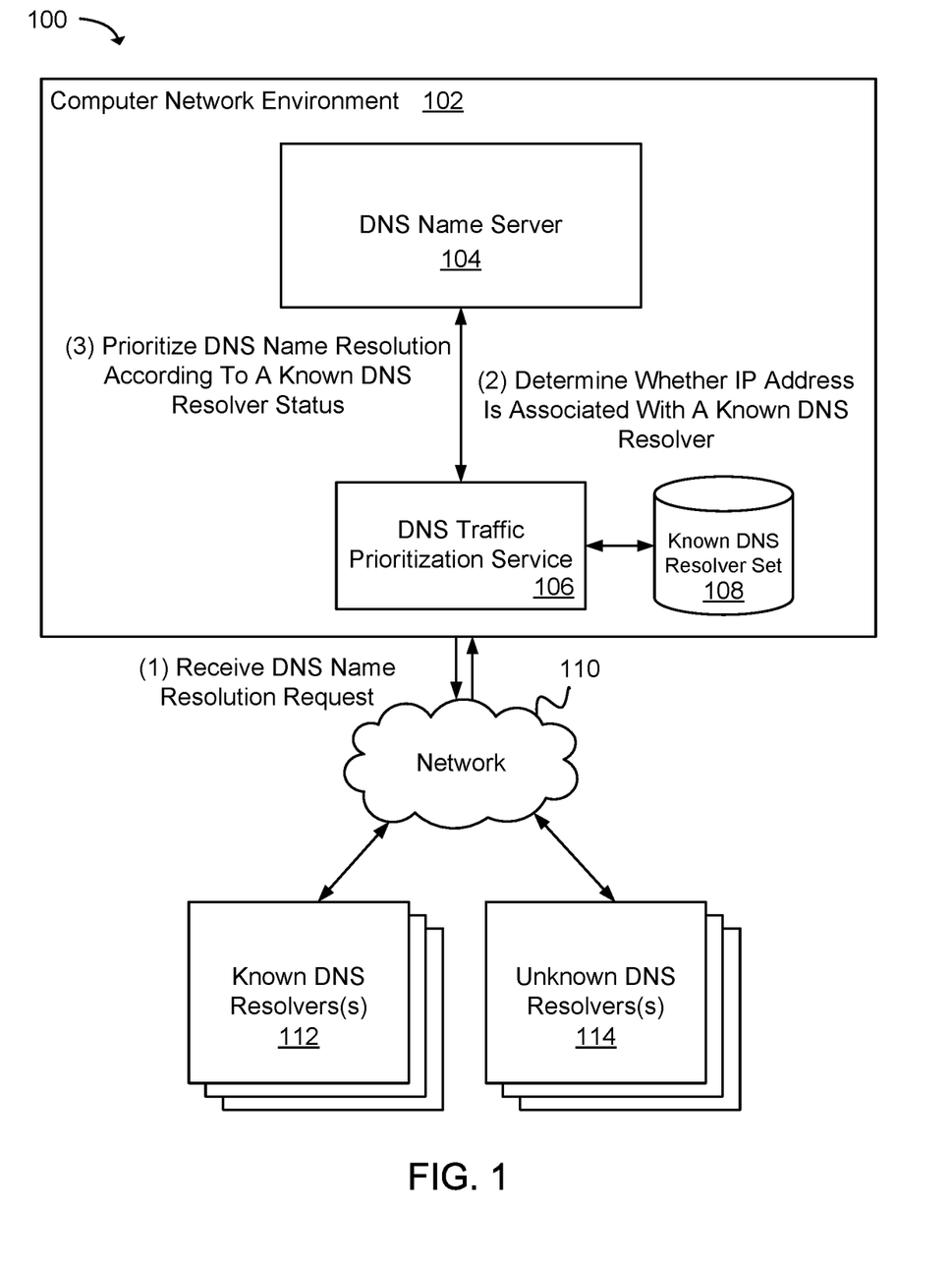
FIG. 1 is a block diagram illustrating an example system for prioritizing DNS name resolution requests received from DNS resolvers.

FIG. 1 is a block diagram illustrating a high level example of a system 100 and a method that may be used to prioritize DNS name resolution requests received from various DNS resolvers. The system 100 may include a computer network environment 102 that may be in communication with a number of known DNS resolvers 112 and unknown DNS resolvers 114 by way of a network 110 (e.g., the Internet). The computer network environment 102 may include a DNS name server 104 that resolves domain names in response to DNS name resolution requests received from the known DNS resolvers 112 and the unknown DNS resolvers 114, and a DNS traffic prioritization service 106 that prioritizes DNS name resolution requests according to the identity of a DNS resolver as a known DNS resolver 112 or an unknown DNS resolver 114. As such, the DNS traffic prioritization service 106 may prioritize DNS name resolution requests so that DNS name resolution requests assigned a high priority are transmitted to the DNS name server 104 and DNS name resolution requests that are assigned a low priority may be dropped in the event that capacity (e.g., network capacity and/or computing resource capacity) for the computing network environment 102 may be fully utilized (e.g., no more capacity is available).

In one example configuration, DNS resolvers that make DNS name resolution requests to the DNS name server 104 may be classified as known DNS resolvers 112 or unknown DNS resolvers 114 by analyzing historical data for past DNS name resolution requests made by a DNS resolver to determine whether the DNS resolver may have characteristics of a valid DNS resolver.

A valid DNS resolver may be a DNS resolver that provides DNS name resolutions to client devices using DNS records that may be cached on the DNS resolver and queries an authoritative DNS name server for DNS records that are expired or not cached on the DNS resolver. Accordingly, a valid DNS resolver may have certain characteristics associated with DNS name resolution requests that indicate that the DNS resolver may make valid DNS name resolution requests, which may be determined by analyzing the historical data associated with a network address for the DNS resolver.

In one example, characteristics associated with a valid DNS resolver may include, but are not limited to: having an IP address that may be static from several days to several months, querying a DNS name server for a DNS name resolution for which the DNS name server may be an authoritative DNS name server, querying a DNS name server for DNS name resolutions of valid domain names (i.e., the domain names actually exist), querying a DNS name server for resolutions of many different domain names (i.e., a broad spectrum of domain names is requested), or caching DNS records on the DNS resolver as evidenced by not querying a DNS name server prior to an expiration of a TTL (Time-To-Live) for a DNS record. These characteristics will be discussed in greater detail in relation to FIG. 3.

In some example configurations, another DNS resolver classification may be a public DNS resolver, also referred to as an open DNS resolver. A public DNS resolver may be a DNS resolver that may be accessible to any client device via the Internet where the public DNS resolver provides domain name resolutions to the client devices. For example, instead of querying an ISP's DNS resolver, a client device may query a public DNS resolver for a DNS name resolution. Examples of public DNS resolvers may include Google Public DNS™ DNS resolution service, Open DNS®, Norton™ DNS server, Microsoft® DNS as well as others. In one example configuration, DNS name resolution requests received from a public DNS resolver may be assigned a lower priority than known DNS resolvers 112, and a higher priority than unknown DNS resolvers 114. In an alternative example configuration, public DNS resolvers may be classified as known DNS resolvers. In a further alternative example configuration, public DNS resolvers may be classified as unknown DNS resolvers, such that DNS name resolution requests received from public DNS resolvers may be assigned a priority less than a priority assigned to a known DNS resolver 112.

A network address for a DNS resolver that has been identified as a known DNS resolver 112 may be included in a known DNS resolver set 108. When determining whether a DNS resolver may be a known DNS resolver, the known DNS resolver set 108 may be queried to determine whether a network address for the DNS resolver may be included in the known DNS resolver set 108. The known DNS resolver set 108 may be stored using a data structure that stores lists (e.g., a key-value data store). As one example, a Bloom filter may be used to store network addresses for known DNS resolvers by adding the network addresses to the Bloom filter. Thus, when determining whether a network address for a DNS resolver may be included in the known DNS resolver set 108, the Bloom filter may be used to determine the status of the DNS resolver as a known DNS resolver.

The known DNS resolver set 108 may be updated periodically to reflect changes that may occur within the set of DNS resolvers that query the DNS name server 104 for DNS name resolutions. DNS name resolution requests associated with a known DNS resolver 112 included in the known DNS resolver set 108 may receive a higher priority in fulfilling the DNS name resolution request as compared to a priority given to DNS name resolution requests received from unknown DNS resolvers 114.

As an illustration of a method that may be used to prioritize DNS name resolution requests, (1) a DNS name resolution request intended for a DNS name server 104 may be received at a network edge device (not shown) of the computer network environment 102, where the DNS resolution request may be forwarded to the DNS traffic prioritization service 106. A network address associated with the DNS name resolution request may be identified and (2) a determination may be made whether the network address may be associated with a known DNS resolver by querying a known DNS resolver set 108.

The DNS name resolution request may be (3) prioritized according to the status of the network address associated with the DNS name resolution request. In the event that the network address associated with the DNS name resolution request is included in the known DNS resolver set 108, the DNS name resolution may receive a higher priority (e.g., first priority) in being sent to the DNS name server 104. In the event that the network address is not included in the known DNS resolver set 108, the network address associated with the DNS name resolution request may be identified as being associated with an unknown DNS resolver. As a result, the DNS name resolution request may receive a lower priority (e.g., second priority) than the priority assigned to a request sent by a known DNS resolver 112 and the DNS name resolution request may either be dropped (e.g., due to the request timing out) or fulfilled after requests having higher priority are fulfilled.

As mentioned above, DNS name resolution requests assigned a lower priority as compared to a priority assigned to DNS name resolution requests associated with known DNS resolvers 112 may be dropped as a result of the computer network environment 102 capacity to accept DNS name resolution requests being full. For example, during a period of high DNS name resolution request volume, such as during a DDoS attack, the bandwidth of the computing network environment may be fully utilized and/or the computing resources of the DNS name server may be consumed by the volume of DNS name resolution requests. Therefore, the DNS name resolution requests may be prioritized using the DNS traffic prioritization service 106. The DNS name resolution requests having a higher priority may be sent to the DNS name server 104 while DNS resolution requests having a lower priority may be dropped when computing capacity is fully utilized (e.g., no more capacity is available).

Figure 2:
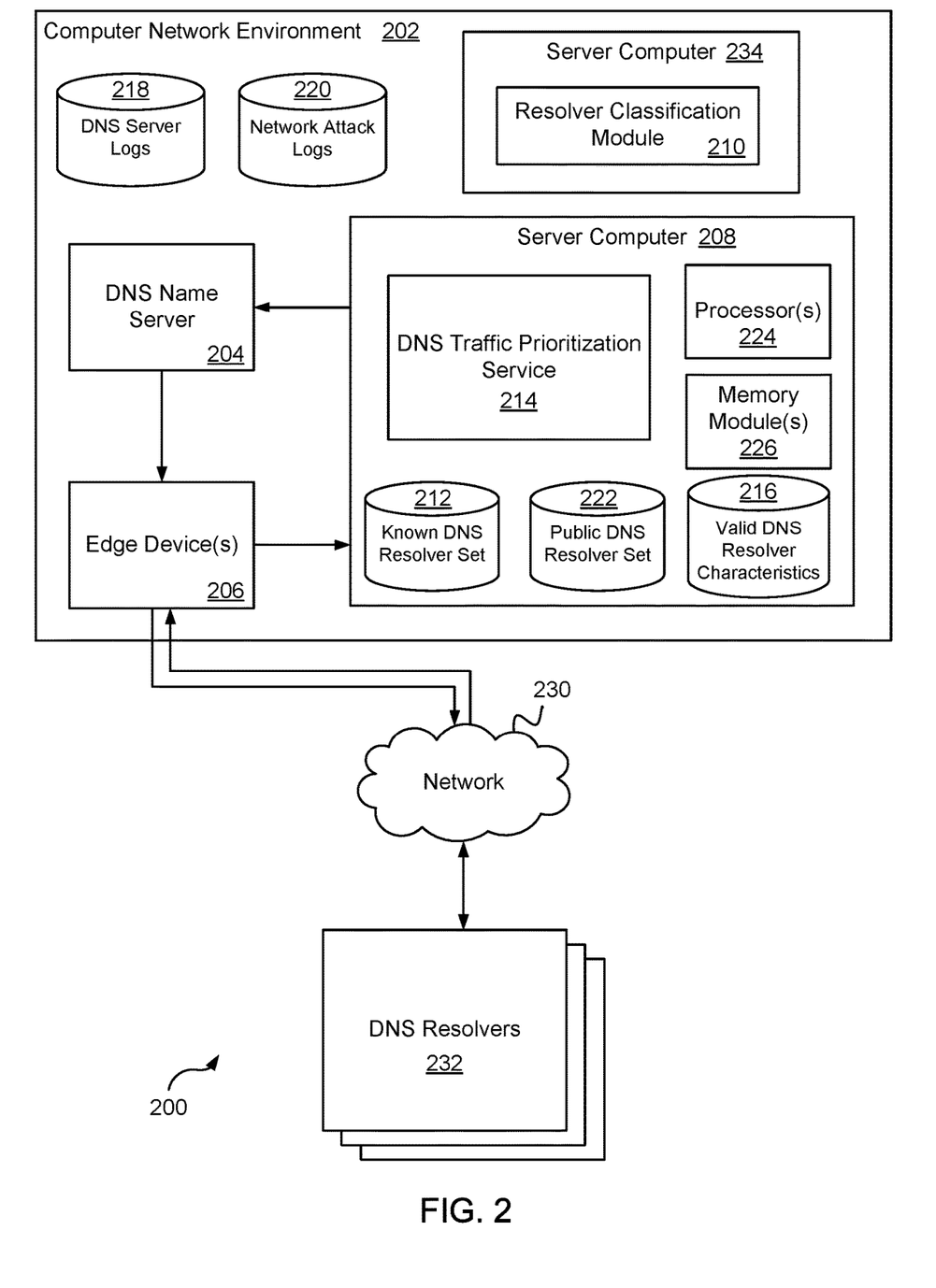
FIG. 2 is a block diagram that illustrates various example components included in a system for prioritizing DNS name resolutions requests received from DNS resolvers.

FIG. 2 illustrates components of an example system 200 on which the present technology may be executed. The system 200 may include a computer network environment 202 that includes one or more DNS name servers 204 that may be in communication with a number of DNS resolvers 232 via a network 230. Included in the computer network environment 202 may be a server computer 208 that may host a DNS traffic prioritization service 214 and a server computer 234 that may host a resolver classification module 210. The server computer 208 may be in communication with one or more network edge devices 206 (e.g., network routers, routing switches, multiplexers, etc.) and the one or more DNS name servers 204, thereby allowing for DNS name resolution requests to be sent from a network edge device 206 to the server computer 208 where the DNS name resolution request may be assigned a priority before the DNS name resolution request is sent to a respective DNS name server 204.

The DNS resolvers 232 that send DNS name resolution requests to a DNS name server 204 may be, in one example, classified as known DNS resolvers and unknown DNS resolvers using the resolver classification module 210. For example, the resolver classification module 210 may be configured to analyze historical data associated with past DNS name resolution requests made by a DNS resolver 232 and classify the DNS resolver 232 as a known DNS resolver or an unknown DNS resolver based on the analysis. In one example configuration, classifying DNS resolvers 232 may be periodically performed offline (out of production), and in another example configuration, DNS resolver 232 classification may be performed online (in production). The analysis of historical data associated with a DNS resolver 232 may identify characteristics of DNS name resolution requests made by the DNS resolver 232 that correspond to DNS name resolution requests associated with a valid DNS resolver.

Examples of valid DNS resolver characteristics 216 that may be used by the resolver classification module 210 to classify DNS resolvers 232 may include a DNS resolver 232 that: has a static network address, queries the DNS name server 204 for a resolution of a domain name for which the DNS name server 204 may be an authoritative DNS name server, queries the DNS name server 204 for resolution of valid domain names, does not query the DNS name server 204 for a DNS record prior to an expiration of a TTL for the DNS record, as well as other valid DNS resolver characteristics 216 not specifically mentioned here, but that are within the scope of this disclosure.

In one example, a TTL in packets sent by a DNS resolver (e.g., an IP packet TTL) may be a valid DNS resolver characteristic 216 used to classify a DNS resolver 232 as a known DNS resolver. An IP packet TTL may be a value set by the sender of an IP packet. The value of the IP packet TTL may be reduced by each networking device (e.g., router, gateway, etc.) that handles the IP packet along the IP packet's path to a destination host. For example, the value of the IP packet TTL may be reduced by one for every hop (e.g., router) that is encountered until the IP packet reaches an intended destination host. The IP packet TTL may be more or less the same value (e.g., within a few hops) for each DNS resolution request received from a DNS resolver 232 having the IP address. As such, the IP packet TTL may be used to identify a known DNS resolver by comparing an expected IP packet TTL range for an IP address with the actual IP packet TTL received from a DNS resolver 232 having the IP address. In the event that the IP packet TTL value is within the expected IP packet TTL range, the DNS resolver 232 may be a known DNS resolver.

Historical data associated with a DNS resolver 232 may be obtained from various sources that may include, but are not limited to, DNS server logs 218, network attack logs 220, network edge devices 206 and various endpoints connected to the computer network environment 202. In one example configuration, historical data associated with a network address for a DNS resolver 232 may be collected from various sources and the historical data may be analyzed to determine whether correlations can be made to identify the valid DNS resolver characteristics 216. In the event that historical data for a network address correlates to one or more valid DNS resolver characteristics 216, the network address may be added to a known DNS resolver set 212, resulting in a DNS resolver 232 associated with the network address being classified as a known DNS resolver. Whereas, DNS resolvers 232 associated with network addresses that may not be added to the known DNS resolver set 212 may be classified as unknown DNS resolvers.

As an illustration, a determination whether a DNS resolver 232 may have a network address that has remained static over a period of time may be made by querying a DNS server log 218 for log entries related to a network address for the DNS resolver. In the case that the entries obtained from the DNS server log 218 show that the network address is associated with DNS queries made over a period of time (e.g., a number of days, weeks or months), the network address may be considered a static network address for the DNS resolver 232 and the network address may be added to the known DNS resolver set 212.

In another example configuration, classifying network addresses for DNS resolvers 232 as known DNS resolvers may further include assigning a score to a network address for a DNS resolver 232 according to characteristics of the DNS resolver 232 that correspond to a valid DNS resolver and including the network address in the known DNS resolver set 212 as a result of the score meeting a threshold value. For example, a predetermined score may be assigned to each of the valid DNS resolver characteristics 216 of a DNS resolver 232. After determining the valid DNS resolver characteristics 216 a DNS resolver 232 may manifest (if any), the scores for the valid DNS resolver characteristics 216 may be evaluated and compared to the threshold value. If the combined scores meet the threshold value, then a network address for the DNS resolver may be included in the known DNS resolver set 212.

In one example, scoring of network addresses for DNS resolvers 232 may be performed periodically (e.g., every 10, 30, 60 minutes) and the scores for a time period (e.g., 1, 2, 7 days) may be aggregated to identify network addresses having the highest scores. The network addresses having the highest scores may be included in the known DNS resolver set 212.

In addition to analyzing historical data (e.g., DNS server logs 218) for a network address to determine whether correlations can be made to valid DNS resolver characteristics 216, historical data obtained from network attack mitigation devices and/or software services may be analyzed for a network address to determine whether the network address may be associated with past network attacks (e.g., a DDoS attack). For example, network attack logs 220 may be analyzed to determine whether a particular network address may have been involved in a network attack. Where there may be evidence that a particular network address may have been involved in a network attack, the network address may not be included in the known DNS resolver set 212, resulting in the network address being classified as a network address associated with an unknown DNS resolver.

In one example configuration, in addition to identifying known DNS resolvers and adding the network address for the known DNS resolver to the known DNS resolver set 212, network addresses for public DNS resolvers may be identified and added to a public DNS resolver set 222.

In one example configuration, a data structure may be used to store the known DNS resolver set 212 and the public DNS resolver set 222. Examples of data structures that may be used include, but are not limited to: a Bloom filter, a trie data structure, a bitmap data structure, a B-tree or a hash table. The known DNS resolver set 212 and the public DNS resolver set 222 may be updated periodically (e.g., daily, weekly, etc.) to reflect changes that may occur within the set of DNS resolvers 232 that make DNS name resolution requests to the DNS name server 204.

The DNS traffic prioritization service 214 may be configured to receive a DNS name resolution request sent through the computer network environment 202 and prioritize the DNS name resolution request according to a classification of a network address as a known DNS resolver or an unknown DNS resolver, and in some examples as a public DNS resolver. As an example, a DNS resolver 232 may query a DNS name server 204 for a DNS name resolution by sending a DNS name resolution request. The DNS name resolution request may be received at a network edge device 206 for the computer network environment 202 and the DNS name resolution request may then be sent to the DNS traffic prioritization service 214. A network address associated with the DNS name resolution request may be identified and the network address may be used to query the known DNS resolver set 212 to determine whether the network address may be included in the known DNS resolver set 212. In the case that the network address may be found in the known DNS resolver set 212, a higher priority may be assigned to the DNS name resolution request, resulting in the placing the DNS name resolution request ahead of any DNS name resolution requests that may have a lower priority. In an alternative example, the DNS traffic prioritization service 214 may be included in the DNS name server 204 and may perform the functions described above.

In the event that the network address may not be found in the known DNS resolver set 212, the DNS name resolution request may be considered as being associated with an unknown DNS resolver and may receive a lower priority (e.g., second priority) than a DNS name resolution request associated with a known DNS resolver.

In another example, after a determining that a network address for a DNS name resolution request is not found in the known DNS resolver set 212, the public DNS resolver set 222 may be queried to determine whether the network address may be included in the public DNS resolver set 222. In the event that the network address may be found in the public DNS resolver set 222, the DNS name resolution request may be assigned a priority that may be less than a priority assigned to a known DNS resolver, but greater than a priority assigned to a unknown DNS resolver.

The services and modules included in the server computer 208 and/or the components of the computer network environment 202 may be accessed using API calls, procedure calls or other network commands according to different technologies. The various processes and/or other functionality contained within the server computer 208 may be executed on the one or more processors 224 that are in communication with the one or more memory modules 226. The may include a number of server computers 208 that are arranged, for example, in one or more server banks or computer banks or other arrangements. The server computers 208 may support a computing environment using hypervisors, virtual machine monitors (VMMs) and other virtualization software. For purposes of convenience, the server computer 208 is referred to in the singular. However, it is understood that a plurality of server computers 208 may be employed in the various arrangements as described above.

The network 230 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
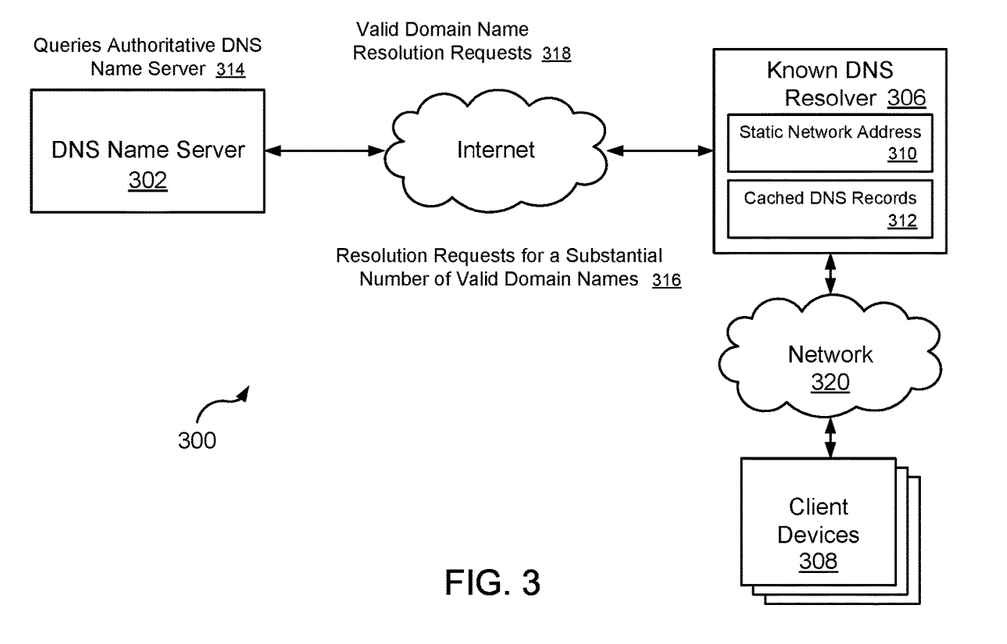
FIG. 3 is a block diagram of an example system illustrating known DNS resolver characteristics that may be used to identify a known DNS resolver.

FIG. 3 is a block diagram illustrating an example system 300 and known DNS resolver characteristics that may be used to identify a DNS resolver as a known DNS resolver. As illustrated, a known DNS resolver 306 may be in communication with a number of client devices 308 via a network 320. The client devices 308 may submit domain names to the known DNS resolver 306 for the purpose of obtaining network addresses that may be mapped to the domain names. This process of obtaining a mapped network address for a domain name may be considered a DNS name resolution.

A known DNS resolver 306 may be a valid DNS resolver that is the server part of the DNS (Domain Name System) that is responsible for sequencing DNS queries received from client devices 308 that result in a DNS name resolution. A DNS query may be either a non-recursive query or a recursive query. A non-recursive query may be a request for a DNS name resolution that a valid DNS resolver may be able to resolve without having to query a DNS name server 302. A recursive query may be a request for a DNS name resolution for which the valid DNS resolver may fully perform (or give an error) by querying an authoritative DNS name server 302 for a DNS record. Resolving a domain name in some cases may involve iterating through several DNS name servers 302 to fully resolve a domain name.

DNS resolvers that make recursive DNS queries to the DNS name server 302 may be classified as known DNS resolvers or unknown DNS resolvers using various DNS resolver characteristics that may be derived from the DNS queries that the DNS resolvers make. For example, DNS resolver characteristics may be used to identify whether a DNS resolver may be a valid DNS resolver that can be added to a set of known DNS resolvers.

FIG. 3 illustrates some example DNS resolver characteristics that may be used to identify a known DNS resolver 306. One example of a characteristic associated with a valid DNS resolver may be a static network address 310 that may be assigned to the valid DNS resolver. A valid DNS resolver may have an assigned network address that may remain unchanged over a period of a number of days, weeks or even months. As a result, a DNS resolver having a static network address 310 may be identifiable via the static network address 310 and historical data for the DNS resolver may be identified and analyzed to determine whether the DNS resolver may be associated with additional characteristics that indicate that the DNS resolver may be a valid DNS resolver.

In some cases, an attacker may mimic (e.g., spoof) the static network address 310 of a known DNS resolver 306 when attacking a DNS name server 302. Accordingly, in combination with a static network address 310, an IP TTL value for the static network address 310 may be used to identify a known DNS resolver 306 as described earlier. As such, in the event that the IP TTL value does not fall within an expected IP TTL value range, the DNS name resolution request may be assigned a lower priority or may be dropped.

Another example of a characteristic associated with a valid DNS resolver may be a DNS resolver that caches DNS records 312. In one example, a DNS resolver that caches DNS records 312 may be identified as a DNS resolver that does not query a DNS name server 302 for a DNS record prior to an expiration of a TTL for the DNS record, thereby demonstrating that the DNS resolver is caching the DNS record for the purpose of responding to DNS queries sent by client devices 308 to the DNS resolver instead of performing a recursive query. As an illustration, a DNS resolver may query a DNS name server 302 for a DNS record, where the DNS record and a TTL for the DNS record may be returned to the DNS resolver. The DNS resolver may then cache the DNS record in memory and respond to DNS queries sent to the DNS resolver by referencing the DNS record stored in cache. Not until the TTL for the DNS record has expired will the DNS resolver re-query the DNS name server 302 for the DNS record.

Another example of a characteristic associated with a valid DNS resolver may be a DNS resolver that queries a DNS name server 302, in a substantial number of instances, with a valid domain name resolution request 318. A valid domain name resolution request 318 may be a request to resolve a domain name that is in actual existence. For example, the domain name is capable of being mapped to a network address using the domain name system. By querying a DNS server 302 for resolutions of valid domain names in a substantial number of instances (accounting for mistakes, such as a mistake made by a person entering a domain name into a client device), an assumption may be made that the DNS resolver is being utilized for the non-malicious purpose of providing domain name resolution services to client devices 308 (e.g., within an ISP environment or as a public DNS resolver).

In addition, valid DNS resolvers may query a DNS name server 302 for resolutions of a substantial number of valid domain names 316, thereby demonstrating that the DNS resolver provides domain name resolution services to a substantial number of client devices 308. For example, one expectation of a valid DNS resolver may be that the DNS resolver provides DNS services to a large number of client devices, such as within an ISP environment. Therefore, DNS name resolution requests sent by a valid DNS resolver to the DNS name server 302 should include requests for resolutions of a substantial number of domain names for which the DNS name server 302 may be an authoritative server.

In line with the example characteristic above, another example of a characteristic associated with a valid DNS resolver may be a DNS resolver that queries a DNS name server 302 for a resolution of a domain name for which the DNS name server 302 is an authoritative DNS name server 314. An authoritative DNS name server may be a DNS name server 302 that provides DNS name resolutions configured by, for example, a domain administrator or dynamic DNS method. As a result, an authoritative DNS name server may respond to DNS queries for domain names that have been configured by the domain administrator, but may not respond to DNS queries for domain names for which the authoritative DNS name server may not be an authority.

DNS resolvers that query a DNS name server 302 for domain name resolutions for which the DNS name server 302 may be an authority demonstrates that the DNS resolver may be configured to recognize the DNS name server 302 as an authoritative DNS name server, providing an assumption that the DNS resolver may be a valid DNS resolver. Whereas, a DNS resolver that queries a DNS name server 302 for a resolution of a domain name that the DNS name server 302 is not an authority demonstrates that the DNS resolver may not be a valid DNS resolver. As will be appreciated, although not illustrated in FIG. 3, other DNS resolver characteristics can be used to identify known DNS resolvers and these other DNS resolver characteristics are included within the scope of this disclosure.

DNS resolvers determined to have one or more of the DNS resolver characteristics described above may be classified as known DNS resolvers 306 and a network address for the DNS resolvers may be included in a known DNS resolver set. DNS resolvers may be reevaluated periodically to determine whether the DNS resolvers exhibit any of the DNS resolver characteristics that may result in classifying the DNS resolvers as a known DNS resolver 306.

Figure 4:
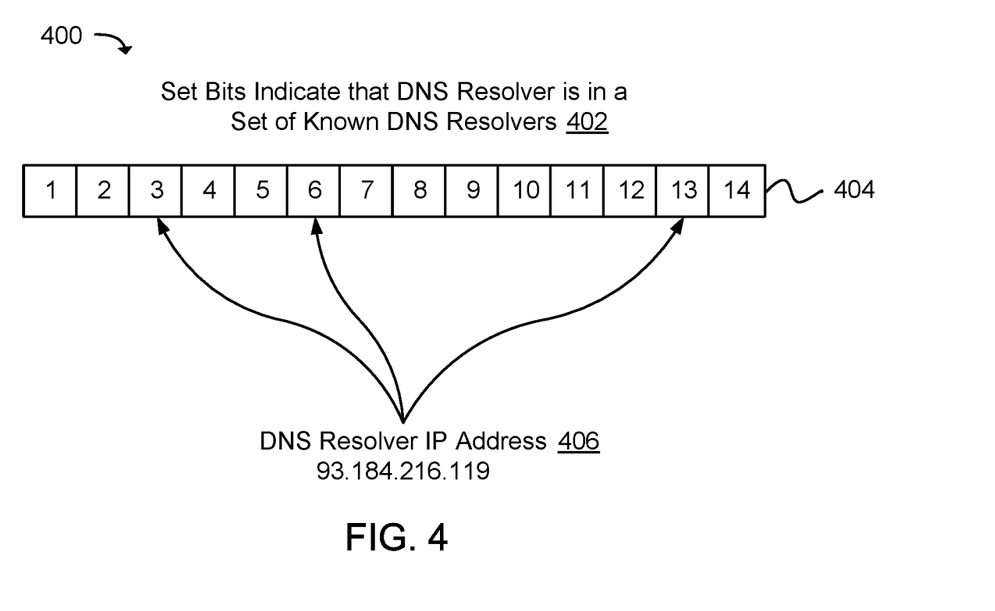
FIG. 4 is a diagram illustrating an example Bloom filter data structure that may be used to determine whether a DNS resolver may be included in a known DNS resolver set.

FIG. 4 illustrates an example Bloom filter 400 data structure that may be used to identify whether a DNS resolver IP address 406 may be included in a known DNS resolver set. A Bloom filter 400 may be an approximate encoding of a set of items or keys using a bit vector of b bits. During encoding, the item is hashed to a number between 1 to b and the corresponding bit in the bit vector is set. To check if an item is a member of the set, the item is hashed and the status of the bit is checked. If the bit is not set, then the item is definitely not in the set. If the bit is set, then either the item is in the set or the hash value of the item collided with the hash value of some other item that is in the set. Because of hash collisions, a Bloom filter may produce false positives (i.e., the item may be reported as in the set, but the item is not in the set), but the Bloom filter does not produce false negatives (i.e., the item is in the set, but not reported).

Some approaches may improve the effectiveness of a Bloom filter by hashing each item several times with independent hash functions. For example, k hashes are used. To encode an item x, the k bits in the bit vector that correspond to $h_i(x)$ for $1 \le i \le k$ are set. To check if item y is a member of the set, item y is hashed k times using the same independent hash functions. The bit corresponding to $h_i(x)$ is examined to determine whether it is set for all $1 \le i \le k$. If any of the k bits are not set, then y cannot be a member of the set, otherwise, all k bits are set and item y is either in the set or a false positive.

In one example configuration, IP addresses for known DNS resolvers may be added to a Bloom filter 400. For example, after classifying a DNS resolver as a known DNS resolver as described earlier, an IP address for the DNS resolver (e.g., the DNS resolver IP address 406) may be hashed using two or more hash functions. Each of the resulting hash values may then be used to set a bit in a bit vector 404 (e.g., from 0 to 1) that corresponds with the hash value.

After adding known DNS resolvers to the Bloom filter 400, DNS resolvers may be identified as known DNS resolvers by querying the Bloom filter 400 to determine whether a DNS resolver network address may be included in the Bloom filter 400. For example, upon receiving a DNS name resolution request from a DNS resolver, a DNS resolver IP address 406 associated with the DNS name resolution request may be hashed using the same hash functions used to add the DNS resolver IP address 406 to the Bloom filter 400. The resulting hash values may then be mapped to corresponding bits in the bit vector 404 to determine whether the corresponding bits have been set. In the event that the bits corresponding to the hash values have been set, then the DNS resolver IP address 406 is for a DNS resolver that is included in the set of known DNS resolvers 402. In the event that the bits are not set, or only some of the bits are set, then the DNS resolver IP address 406 is not associated with a known DNS resolver.

Figure 5:
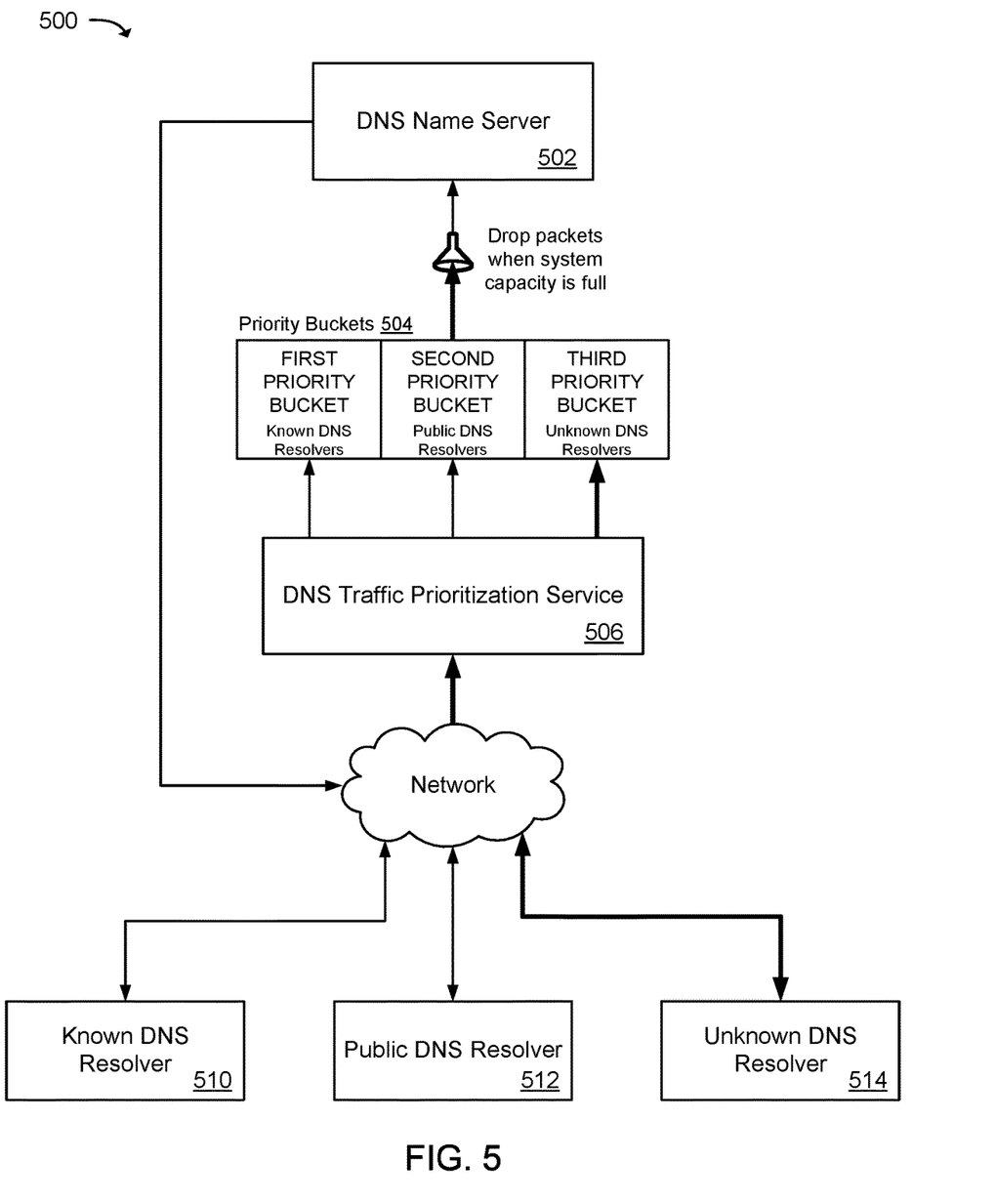
FIG. 5 is a block diagram that illustrates an example system for prioritizing DNS name resolution requests.

Moving now to FIG. 5, a block diagram illustrates an example system 500 for prioritizing DNS name resolution requests using a priority buckets 504. As illustrated, the priority buckets 504 may be separated into first priority, second priority and third priority buckets where DNS name resolution requests received from a known DNS resolver may be assigned first priority, DNS name resolution requests received from a public DNS resolver may be assigned second priority and DNS name resolution requests received from an unknown DNS resolver may be assigned third priority. (Further embodiments can use other numbers of buckets.) As a result, DNS name resolution requests contained in the first priority bucket may be sent to a DNS name server 502 before DNS name resolution requests contained in the second priority bucket and the third priority bucket. And similarly, DNS name resolution requests contained in the second priority bucket may be sent to a DNS name server 502 after DNS name resolution requests contained in the first priority bucket, but before DNS name resolution requests contained in the third priority bucket.

As an illustration, DNS name resolution requests may be sent to a DNS name server 502 by known DNS resolvers 510, public DNS resolvers 512 and unknown DNS resolvers 514. The DNS name resolution requests may be provided to a DNS traffic prioritization service 506 that may assign a priority to the DNS name resolution requests according to the status of the DNS resolvers associated with the DNS name resolution requests as known, public or unknown DNS resolvers.

The assignment of a priority to the DNS name resolution requests may be performed by assigning each DNS name resolution request to the priority buckets 504 according to the status of the DNS name resolution request. For example, a DNS name resolution request associated with a known DNS resolver may be assigned to the first priority bucket, a DNS name resolution request associated with a public DNS resolver may be assigned to the second priority bucket and a DNS name resolution request associated with an unknown DNS resolver may be assigned to the third priority bucket.

The DNS name resolution requests may be sent to the DNS name server 502 according to the separated priorities of the priority buckets 504. For example, a capacity (e.g., network capacity and/or computing resource capacity) may be determined for the system 500 and DNS resolution requests may be provided to the DNS name server 502 according to the priority of the DNS resolution requests. During periods of high network traffic where capacity of the system 500 may be fully utilized, DNS resolution requests having a lower priority may be dropped. As a result of prioritizing the DNS name resolution requests, the DNS name resolution requests for known DNS resolvers 510 may be provided to the DNS name server 502 during times of high network traffic, such as during a network attack.

Figure 6:
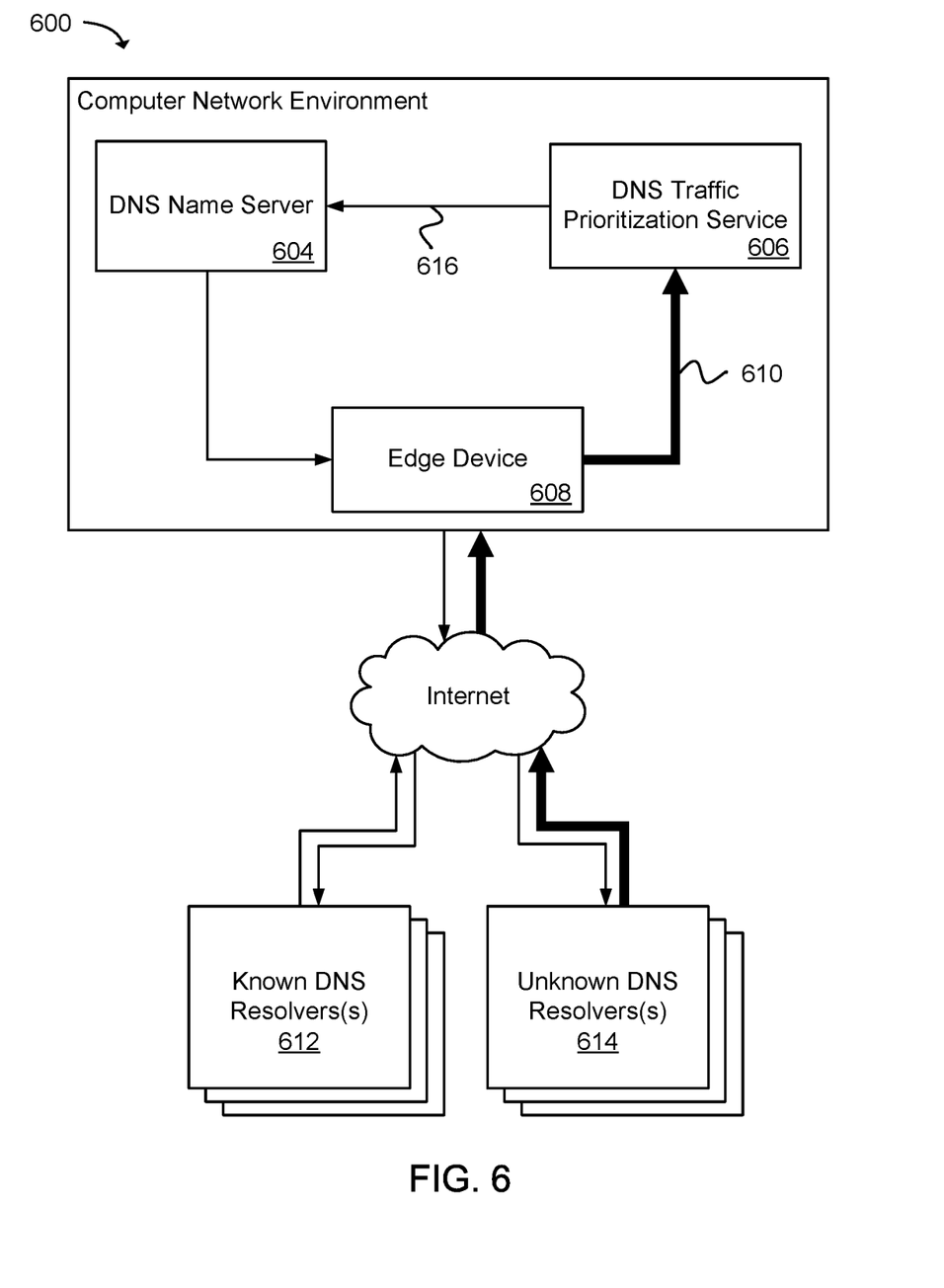
FIG. 6 is a block diagram illustrating an example system for prioritizing DNS name resolution requests received from known DNS resolvers and unknown DNS resolvers.

FIG. 6 is a block diagram illustrating an example of a system 600 for prioritizing DNS name resolution requests received from known DNS resolvers 612 (including public DNS resolvers) and unknown DNS resolvers 614. Depicted is an amount of network traffic 610 associated with DNS name resolution requests sent from the known DNS resolvers 612 and the unknown DNS resolvers 614 to a DNS name server 604, and an amount of network traffic 616 that is sent to the DNS name server 604 as a result of prioritization that may be performed by a DNS traffic prioritization service 606.

Illustratively, network traffic received from unknown DNS resolvers 614 may increase during a malicious attack on the DNS name server 604. The purpose of the malicious attack may be to overwhelm the resources of the DNS name server 604 preventing DNS name resolution requests sent from known DNS resolvers 612 from being answered.

As illustrated, network traffic received at an edge device 608 may be sent to the DNS traffic prioritization service 606 where DNS name resolution requests may be assigned a priority according to the status of a DNS resolver associated with the DNS name resolution request as a known or unknown DNS resolver. In the event of a malicious attack on the DNS name server 604, an amount of network traffic 610 may be high. After assigning a priority to the DNS name resolution requests included in the network traffic 610, DNS name resolution requests associated with a known DNS resolver may be assigned first priority and the amount of network traffic 616 containing the DNS name resolution requests having first priority may be sent to the DNS name server 604.

Those DNS name resolution requests associated with unknown DNS resolvers may be assigned second priority (or a priority lower than first priority) and therefore may only be sent to the DNS name server 604 once DNS resolution requests having first priority have been sent to the DNS name server 604. In the event that a DNS name resolution request having a priority less than first priority is not sent to the DNS name server 604 (e.g., the DNS name resolution request times out), the DNS name resolution request may be dropped (i.e., removed from memory). As a result of prioritizing the amount of network traffic 610 (e.g., during a malicious attack), the amount of traffic 616 sent to the DNS name server 604 may be limited to an amount that does not overwhelm the computing resources of the DNS name server 604.

Figure 7:
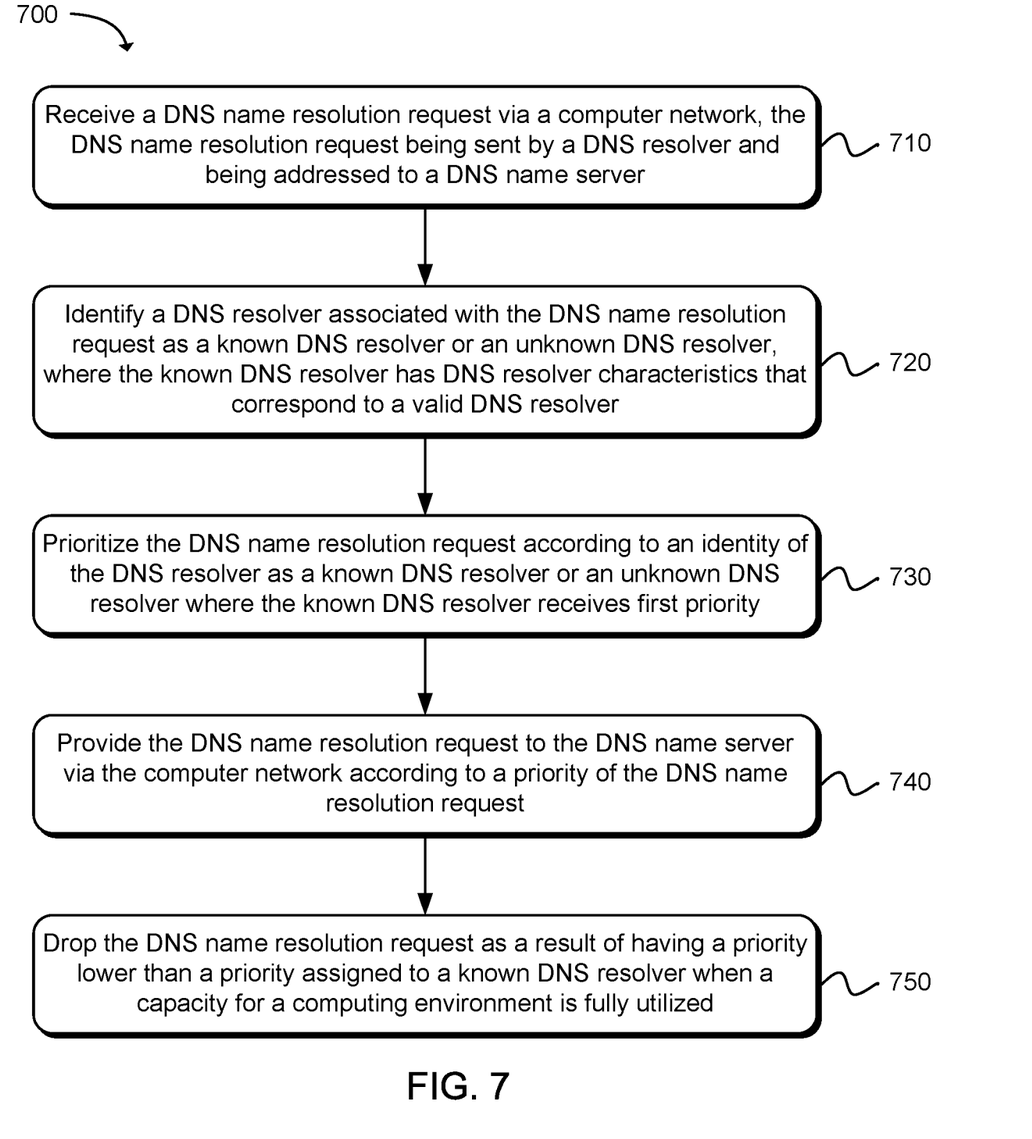
FIG. 7 is a flow diagram illustrating an example method for prioritizing DNS name resolution requests according to a status of a DNS name resolver as a known DNS resolver or an unknown DNS resolver.

FIG. 7 is a flow diagram illustrating an example of a method 700 for prioritizing DNS name resolution requests according to a status of a DNS name resolver as a known DNS resolver or an unknown DNS resolver. Beginning in block 710, a DNS name resolution request may be received via a computer network where the DNS name resolution request may be sent by a DNS resolver and the DNS name resolution request may be addressed to a DNS name server.

As in block 720, a DNS resolver associated with the DNS name resolution request may be identified as a known DNS resolver or an unknown DNS resolver, where a known DNS resolver may have DNS resolver characteristics that correspond to a valid DNS resolver. In one example, a DNS resolver may be identified as a known DNS resolver by determining whether the DNS resolver may be included in a set of known DNS resolvers. The set of known DNS resolvers may be constructed by obtaining historical data associated with network addresses for DNS resolvers that query a DNS name server for domain name resolutions and classifying the network addresses as known DNS resolvers using the historical data. In one example, the historical data may be obtained from at least one of: DNS server logs, network attack mitigation device logs, or a record of DNS resolvers having static network addresses. The set of known DNS resolvers may be stored using a Bloom filter, a trie data structure, a bitmap data structure, a binary search tree, a hash table or another type of data structure. The set of known DNS resolvers may be updated periodically by analyzing historical data associated with DNS name resolution requests made by DNS resolvers to determine which of the DNS resolvers to include in the set of known DNS resolvers.

Having identified the DNS resolver associated with the DNS name resolution request as a known DNS resolver or an unknown DNS resolver, as in block 730, the DNS name resolution request may be prioritized according to an identity of the DNS resolver as a known DNS resolver or an unknown DNS resolver, where a known DNS resolver receives first priority and an unknown DNS resolver receives a priority less than first priority. In one example, second priority may be assigned to a DNS name resolution request from a public DNS resolver and third priority may be assigned to a DNS name resolution request from an unknown DNS resolver.

As in block 740, the DNS name resolution request may then be provided to the DNS name server via the computer network according to the priority assigned to the DNS name resolution request. As in block 750, a DNS name resolution request having a priority lower than first priority may be dropped as a result of a capacity for a computer network being fully utilized, whereas DNS name resolution requests having first priority may be provided to the DNS name server.

Figure 8:
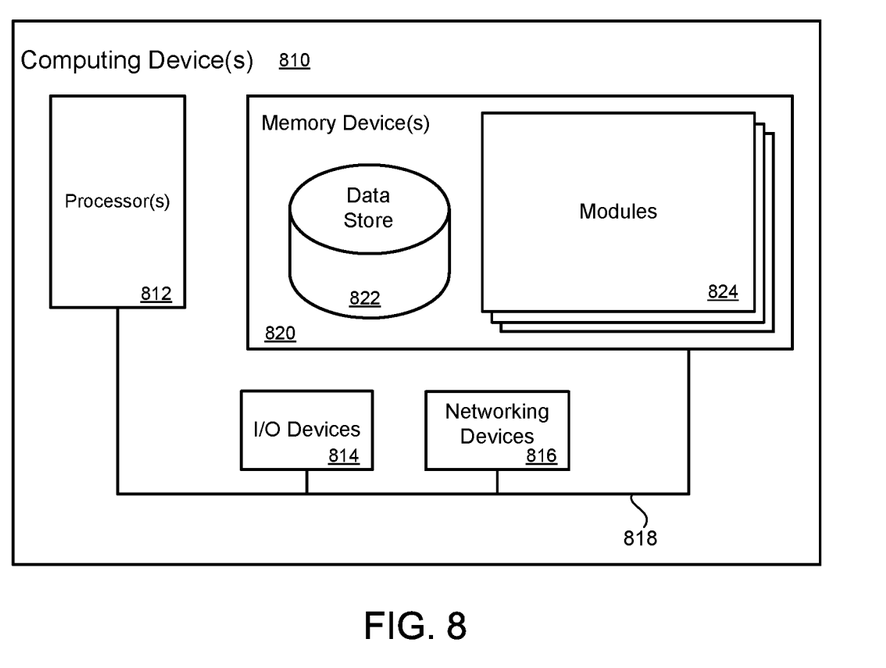
FIG. 8 is block diagram illustrating an example of a computing device that may be used to execute a method for prioritizing DNS name resolutions requests received from DNS resolvers.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules 824 and services that are executable by the processor(s) 812 and data for the modules 824. The modules 824 services may include a resolver classification module, a DNS traffic prioritization service, as well as other modules services. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system, comprising:
    at least one processor;
    at least one memory device including instructions that, when executed by the at least one processor, cause the system to:
    identify a DNS (Domain Name System) resolver as a public DNS resolver, wherein the public DNS resolver is made available to client devices connected to the Internet and the public DNS resolver provides domain name resolutions for destination hosts accessible to the client devices via the Internet;
    receive a DNS name resolution request from the public DNS resolver, wherein the DNS name resolution request is addressed to a DNS name server;
    assign a priority to the DNS name resolution request received from the public DNS resolver that is lower priority as compared to a priority assigned to DNS name resolution requests received from known DNS resolvers, wherein a known DNS resolver is a DNS resolver that has been identified as having DNS resolver characteristics that correspond to valid DNS resolvers; and
    provide the DNS name resolution request to the DNS name server according to the priority assigned to the DNS name resolution request.

2. The system as in claim 1, wherein the priority assigned to the DNS name resolution request received from the public DNS resolver is higher than a priority assigned to DNS name resolution requests received from unknown DNS resolvers.

3. The system as in claim 1, wherein the priority assigned to the DNS name resolution request received from the public DNS resolver is equal to a priority assigned to DNS name resolution requests received from unknown DNS resolvers.

4. The system as in claim 1, wherein the memory device further includes instructions that, when executed by the at least one processor, cause the system to:
    obtain historical data for DNS name resolution requests associated with DNS resolvers that query a DNS name server for DNS name resolutions;
    analyze the historical data associated with the DNS resolvers for DNS resolver characteristics that are associated with valid DNS resolvers; and
    classify a DNS resolver that has DNS resolver characteristics associated with the valid resolvers as a known resolver.

5. The system as in claim 4, wherein the DNS resolver characteristics include at least one of: an IP address that is static from several days to several months, queries for DNS name resolutions for which the DNS name server is an authoritative DNS name server, queries for DNS name resolutions of valid domain names, queries for DNS name resolutions for multiple domain names, and respecting a TTL (Time-To-Live) by caching DNS records obtained from the DNS name server.

6. The system as in claim 1, wherein the memory device further includes instructions that, when executed by the at least one processor, cause the system to drop the DNS name resolution request having a priority lower than a priority assigned to a known DNS resolver as a result of a capacity for a computing environment being fully utilized.

7. A computer implemented method, comprising:
analyzing historical data for resolution requests associated with DNS (Domain Name System) resolvers to identify known DNS resolvers, wherein the known DNS resolvers have DNS resolver characteristics that correspond to valid DNS resolvers;
receiving a DNS name resolution request from a public DNS resolver, the DNS name resolution request being addressed to a DNS name server, wherein the public DNS resolver is made available to client devices connected to the Internet and the public DNS resolver provides domain name resolutions for destination hosts accessible to the client devices via the Internet;
assigning a priority to the DNS name resolution request received from the public DNS resolver that is equal to or lower than a priority assigned to DNS name resolution requests received from the known DNS resolvers; and
sending the DNS name resolution request to the DNS name server according to the priority assigned to the DNS name resolution request.

8. The method as in claim 7, wherein the priority assigned to the DNS name resolution request received from the public DNS resolver is higher than a priority assigned to DNS name resolution requests received from unknown DNS resolvers.

9. The method as in claim 7, wherein analyzing the historical data for resolution requests associated with the DNS resolvers further comprises:
obtaining the historical data for the resolution requests associated with the DNS resolvers from at least one of: DNS server logs, network attack mitigation device logs, or a record of DNS resolvers having static network addresses;
classifying the DNS resolvers that have DNS resolver characteristics that correspond to valid DNS resolvers as known DNS resolvers; and
classifying the DNS resolvers made available to client devices connected to the Internet and provide domain name resolutions for destination hosts accessible via the Internet to the client devices as public DNS resolvers.

10. The method as in claim 9, wherein classifying the DNS resolvers as known DNS resolvers further comprises:
assigning a score to a DNS resolver according to characteristics of the DNS resolver that correspond to a valid DNS resolver; and
classifying the DNS resolver as a known DNS resolver as a result of the score meeting a threshold value.

11. The method as in claim 7, further comprising classifying public DNS resolvers as known DNS resolvers based in part on the analysis of the historical data for the resolution requests associated with DNS resolvers.

12. The method as in claim 7, further comprising classifying public DNS resolvers as unknown DNS resolvers based in part on the analysis of the historical data for the resolution requests associated with DNS resolvers.

13. The method as in claim 7, further comprising:
adding DNS resolvers classified as known DNS resolvers to a known DNS resolver set; and
adding DNS resolvers classified as public DNS resolvers to a public DNS resolver set.

14. The method as in claim 13, wherein receiving the DNS name resolution request further comprises determining whether the DNS resolver is included in the known DNS resolver set or the public DNS resolver set.

15. The method as in claim 7, wherein the DNS resolver characteristics that correspond to valid DNS resolvers includes at least one of: having a network address that is unchanged over a period of time, having a network address that is static and where a TTL (Time-To-Live) value for the network address falls within an expected TTL range for the network address, does not query the DNS name server for a DNS record prior to an expiration of a TTL for the DNS record, queries the DNS name server for a resolution of a domain name for which the DNS name server is an authoritative DNS name server, is an ISP (Internet Service Provider) DNS resolver, and a substantial number of resolution requests are for a resolution of a valid domain name.

16. The method as in claim 7, further comprising:
determining that a capacity of a computing environment to accept DNS name resolution requests is full; and
dropping the DNS name resolution requests having a lower priority as compared to a priority assigned to other DNS name resolution requests.

17. A non-transitory machine readable storage medium having instructions embodied thereon, the instructions when executed by at least one processor:
identify a DNS (Domain Name System) resolver as a public DNS resolver, wherein the public DNS resolver is made available to client devices connected to the Internet and the public DNS resolver provides domain name resolutions for destination hosts accessible to the client devices via the Internet;
receive a DNS name resolution request from the public DNS resolver, wherein the DNS name resolution request is addressed to a DNS name server;
assign a priority to the DNS name resolution request received from the public DNS resolver that is lower than a priority assigned to DNS name resolution requests received from known DNS resolvers and is higher than a priority assigned to unknown DNS resolvers; and
send the DNS name resolution request to the DNS name server according to the priority assigned to the DNS name resolution request.

18. The non-transitory machine readable storage medium as in claim 17, wherein the instructions that when executed by the at least one processor further:
classify DNS resolvers that have DNS resolver characteristics that correspond to valid DNS resolvers as known DNS resolvers; and
classify DNS resolvers made available to client devices connected to the Internet and providing domain name resolutions for destination hosts accessible via the Internet to the client devices as public DNS resolvers.

19. The non-transitory machine readable storage medium as in claim 17, wherein the instructions that when executed by the at least one processor further:
assign a first priority to DNS name resolution requests received from DNS resolvers classified as known DNS resolvers;
assign a second priority to DNS name resolution requests received from DNS resolvers classified as public DNS resolvers; and assign a third priority to DNS name resolution requests received from DNS resolvers determined to be unknown DNS resolvers.

20. The non-transitory machine readable storage medium as in claim 17, wherein the instructions that when executed by the at least one processor further:
   add the DNS name resolution request to a priority bucket that corresponds to the priority assigned to the DNS name resolution request,
   wherein DNS name resolution requests are sent to the DNS name server according to priority designations of the priority buckets.

\* \* \* \* \*